ELECTRON BEAM RECORDER WITH FRAME RATE CONVERSION

Filed Nov. 3, 1965 Sheet 1 of 3

INVENTORS
RICHARD F. DUBBE
EDWARD W. REED, JR.
BY Carpenter, Kinney & Coulter
ATTORNEYS

ELECTRON BEAM RECORDER WITH FRAME RATE CONVERSION

INVENTORS
RICHARD F. DUBBE
EDWARD W. REED, JR.
BY Carpenter, Kinney & Coulter
ATTORNEYS

ELECTRON BEAM RECORDER WITH FRAME RATE CONVERSION

INVENTORS
RICHARD F. DUBBE
EDWARD W. REED, JR.
BY Carpenter, Kinney & Coulter
ATTORNEYS 3,444,317
ELECTRON BEAM RECORDER WITH FRAME RATE CONVERSION Richard F. Dubbe, Richfield, and Edward W. Reed, Jr., St. Paul, Minn., assignors to Minnesota Mining and Manufacturing Company, St. Paul, Minn., a corporation of Delaware Filed Nov. 3, 1965, Ser. No. 506,185
Int. Cl. H04n 5/84
U.S. Cl. 178—6.7 14 Claims

ABSTRACT OF THE DISCLOSURE

Electron beam recording apparatus adapted for use as a frame rate conversion system for recording video information on an electron sensitive media is shown wherein an electron beam is modulated by the video information at a number of scan frames per unit time and scanned on a media which is intermittently advanced and scanned by the electron beam at a number of media frames per unit time which is less than the number of scan frames per unit time and the electron beam is blanked by a blanking means so as to record on the media a predetermined number of scan frames per unit time which equal the number of media frames per unit time.

This invention relates to a video signal recorder and in one embodiment to a means for synchronizing recording of scan patterns containing video information directly on an electron sensitive media by an electron beam modulated in accordance with video signals containing said video information.

Scan patterns containing video information have heretofore been recorded on a variety of recording media such as photographic film or thermoplastic film. The two known types of recorders used for such recording are kinescope recorders and electron beam recorders.

Kinescope recorders employed special movie cameras having a lens and an intermittent mechanism for photographing scan patterns or pictures from the face of a kinescope tube. A conventional kinescope tube is evacuated and has a glass faceplate with a phosphor screen coated on the inner surface thereof. A modulated electron beam directly impinges upon and scans the phosphor screen causing the phosphor to produce a light pattern defining a television picture on the faceplate. The movie camera was positioned directly in front of the faceplate and the camera lens collects and focuses light from the television picture appearing on the faceplate of the tube onto and exposes a high speed, large grain motion picture film. Exposed and developed motion picture film are projected by conventional motion picture projectors which have a standard film advance of 24 frames per second. During recording, the kinescope recorders expose and advance motion picture film, via an intermittent mechanism, at a rate of 24 frames per second. Television pictures are produced in response to synchronizing signals at the rate of 30 television frames per second from 60 television fields per second. Frame conversion was necessary between the intermittent mechanism, which advanced the film at 24 frames per second, and the synchronizing signals, which produced the television pictures at 30 television frames per second. Conventionally, such frame conversion between the intermittent mechanism and the television frames has been accomplished by either electronic or mechanical shutters. However, it is not necessary that the frame conversion be synchronized with the vertical synchronizing signals of the composite video signal or television signal.

In the other known type of video signal recorder, known as electron beam recorder, the glass faceplate of the tube, its associated phosphor screen and the camera lens have been eliminated by bringing the electron sensitive media such as photographic film inside the vacuum chamber of the tube. Such known electron beam recorders provide increase resolution of pictures recorded on the electron sensitive media. Resolution of the recorded picture is improved primarily due to elimination of the phosphor screen associated with the inherent limitations of the camera lens, the flare and halations caused by the faceplate of the tube and the distortions and aberrations associated with focusing and deflecting of the beam on the faceplate. Additionally, picture resolution is improved because electron beam recorders can use slow speed, fine grain electron sensitive media whereas kinescope recorders must use high speed, large grain media.

However, up to the present invention no means has been provided for conversion of the video frame rate to the recorder frame rate, thus it has been impossible to take advantage of the electron beam technique to make recordings suitable for movie picture projection.

In accordance with the present invention, synchronized frame conversion in an electron beam recording system is provided between the modulated electron beam, which produces scan patterns in response to synchronizing signals at a number of scan frames per unit time, and an intermittent mechanism, which advances an electron sensitive media within an evacuatable chamber of the electron gun, at a number of media frames per unit time which is less than the number of scan frames per unit time. This synchronized frame conversion results in the modulated electron beam exposing the electron sensitive media, for example a photographic film, at the rate of 24 frames per second such that the developed film can be projected by conventional motion picture projectors.

One object of the present invention is to record scan frames containing video information on a recording media in a number of media frames which is less than the number of scan frames containing the video information.

Another object of the present invention is to provide an electron beam recorder which provides synchronized frame conversion between the electron sensitive media and the scanning electron beam.

The synchronized frame conversion of this invention is accomplished by initially phase locking the operation of the intermittent mechanism with the vertical synchronizing signal portion of the synchronizing signals which control the scanning of the electron beam in the scan pattern. Additionally, the intermittent mechanism includes means for producing timing pulses, at a rate equal to the number of media frames per unit time, each time a media frame is positioned to record a scan frame. A control device responds to the timing pulses from the intermittent mechanism and to the horizontal synchronizing portion of the synchronizing signals to control beam blanking, for example turning the beam off when the intermittent mechanism advances a new media frame into position and turning the beam on for recording a television frame on the media frame. A counter, responsive to the control device unblanking the beam, counts horizontal synchronizing pulses as the television frame is recorded onto the media frame. When a complete television frame has been recorded on the media frame, the counter produces an output signal indicating to the control device that a complete frame has been recorded and that the beam should be blanked during the media advancement. The synchronized frame conversion results in a predetermined number of scan frames being recorded as media frames on the media.

The above and further objects of the present invention will become fully apparent when considered in light of the following detailed description which refers to the accompanying drawing wherein.

Briefly, the apparatus for causing the electron beam to record video information contained in the scan pattern directly on an electron sensitive media includes an evacuatable chamber which encloses a means for generating an electron beam modulated by video signals containing the video information. The beam generating means directs the modulated beam along a predetermined path to bombard and expose the electron sensitive media positioned by an intermittent means within the evacuatable chamber. The electron beam is deflected in a scan pattern directly on the media in response to generated scanning signals at a number of scan frames per unit time. The media is intermittently advanced by the intermittent means within the evacuatable chamber relative to the electron beam at a number of media frames per unit time which is less than the number of scan frames per unit time. Means which are responsive to the generated scanning signals and to the media advancing means are provided for blanking the modulated beam during advancement of the media within the evacuatable chamber so as to synchronize a predetermined number of the scan frames per unit time with the lesser number of media frames per unit time. The blanking means includes means for starting the beam recording a scan frame on the media when the media advancing means has positioned a new media frame relative to the beam. When a scan frame has been recorded on a media frame, the beam is removed from the media while the intermittent means advances and positions a new media frame relative to the beam for recording a new scan frame. This results in a synchronization wherein the predetermined number of scan frames per unit time equals the number of media frames per unit time.

Figure 1:
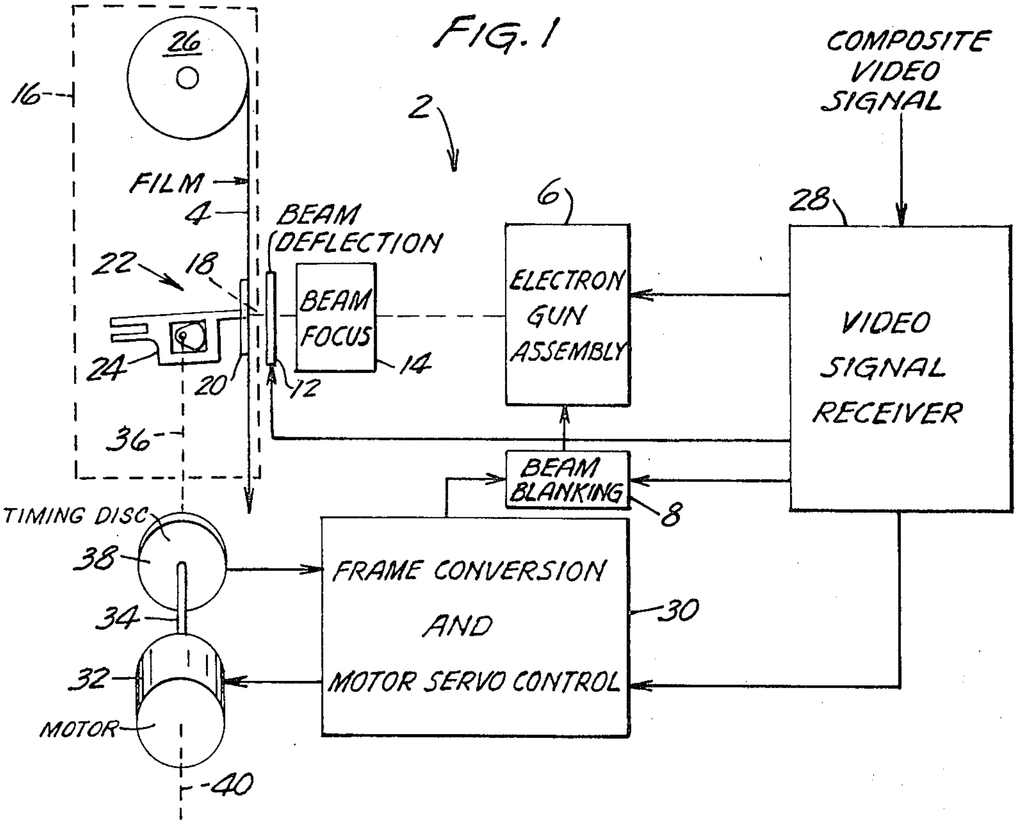
FIGURE 1 is a diagrammatic representation partially in block form including an illustration of an intermittent mechanism for advancing electron sensitive media in a preferred embodiment of the present invention.

Referring now to FIGURE 1, a preferred embodiment of a video signal recorder of the present invention includes a conventional electron beam generating means denoted generally as 2 for producing a modulated electron beam for bombarding and exposing an electron sensitive media such as a conventional silver halide emulsion photographic film 4. The electron beam generating means 2 broadly includes a conventional electron gun assembly 6, and a blanking means 8 each of which are disposed in an evacuatable vacuum chamber. A conventional beam deflection means 12 and a conventional beam focusing means 14 axially surrounding the electron beam and beam path are located outside of the vacuum chamber. The photographic film 4 is also located within the vacuum chamber but within a film transport enclosure 16.

The film transport enclosure 16 has a film aperture 18 at one end thereof which positions that part of the film 4 to be exposed, within the vacuum chamber to be bombarded by the electron beam produced by the beam generating means 2. A pressure plate 20 is located on the opposite side of film 4 adjacent the aperture 18. The pressure plate 20 places the film 4 against the sides of aperture 18. A film advancing means designated generally as 22 operates to position the film 4 in the aperture 18 to permit bombardment by the modulated electron beam to produce a frame exposure. The advancing means 22 includes an intermittent mechanism 24 which positions the film 4 relative to the electron beam and advances said film 4, during pull-down for a new frame exposure, from a supply reel 26 to a take-up reel (not shown) within enclosure 16. The intermittent mechanism comprises a cam and film pull-down shuttle similar to those employed in known motion picture cameras and projectors.

The electron beam recorder is employed for recording video information, such as composite video signals as used in television systems, as frames on the photographic film 4. A composite video signal comprises three components: (1) a non-composite video signal containing television picture information; (2) synchronizing signals comprising horizontal and vertical synchronizing pulses to synchronize the electron beam scanning with a trasmitter to produce the television picture; and (3) horizontal and vertical blanking signals to make the scanning retraces invisible.

The electron beam recorder of FIGURE 1 employs a conventional video signal receiver 28 to receive the video information in the form of a composite video signal. The receiver 28 separates the composite video signal into its separate components and applies the non-composite video signal, synchronizing pulses and blanking signals to the electron beam generating means 2, and synchronizing pulses and blanking signals to a frame conversion and motor servo control 30.

In conventional television systems, a television picture having 525 interlaced horizontal scanning lines is produced at the rate of 30 frames per second and each picture comprises two interlaced television fields. Each television field comprises 262.5 horizontal scanning lines per field comprising either a field of an odd number of scan lines making an odd field or a field of an even number of scan lines making an even field. The television fields are produced at the rate of 60 fields per second. The electron gun assembly 6 of the electron beam generating means 2 produces an electron beam which is modulated by the non-composite video signal. The modulated electron beam is directed along a predetermined path to bombard and expose the film 4 in the aperture 18. The beam focus means 14 operates as an electron lens for focusing the modulated electron beam into a narrow beam. The beam deflecting means 12 of the electron beam generating means 2 deflects the modulated electron beam into a raster or scan pattern to produce the total of 30 television pictures per second from the 60 television fields per second.

The intermittent mechanism 24 positions the film 4 to permit bombardment and exposure by the electron beam and advances said film relative to the electron beam to record picture frames thereon at the rate of 24 frames per second. The intermittent mechanism 24 of the film advancing means 22 is driven by a motor 32 via a shaft 34 and a gear reduction means denoted generally as 36. A timing disk 38 is connected to shaft 34 and is rotated at the same revolutions per minute (r.p.m.) as the motor 32. The motor 32 also drives the film take-up and supply reels and associated film sprocket drive by a film drive means 40.

The frame conversion and motor servo control 30 is operatively connected to the generating means 2, particularly the blanking means 8. The control 30, in addition to receiving synchronizing pulses and blanking signals from the receiver 28, receives timing pulses generated by the timing disk 38. Two separate timing pulses are generated; the first timing pulses are generated at a rate equal to the frames per unit time of the film advancing means 22 and the second timing pulses are generated at a rate equal to the vertical synchronizing pulses associated with the composite video signal. The control 30 synchronizes a predetermined number of the picture frames per unit time produced by the deflecting means 12 in response to the generated scanning signals comprising horizontal and vertical synchronizing pulses with the lesser frames per unit time advanced by the intermittent mechanism 24. The control 30 includes means for energizing the blanking means 8 to deflect the electron beam from the film 4 when a frame has been recorded on the film requiring the intermittent mechanism 24 to pull down the film for a new frame exposure.

Figure 2:
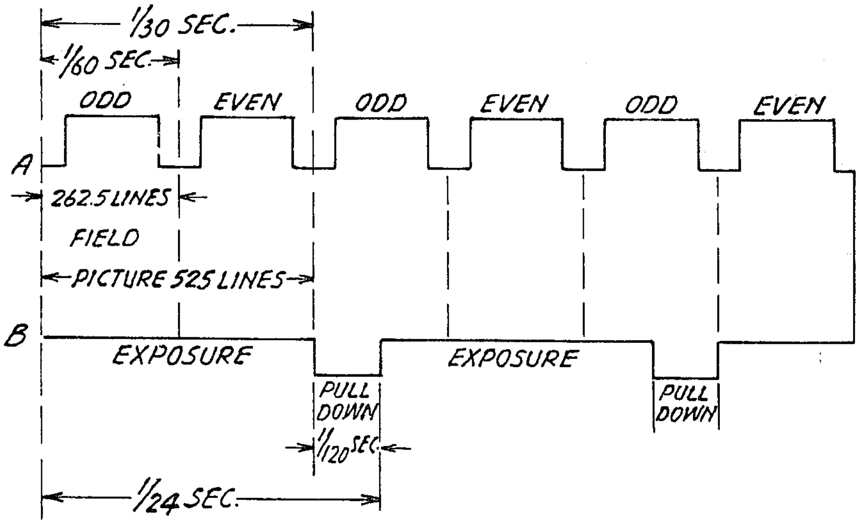
FIGURE 2 is a graph illustrating a typical waveform of a video signal containing video information and the corresponding operating cycle of the intermittent mechanism of FIGURE 1.

Referring now to FIGURE 2, waveform A illustrates a simplified video information signal, applied as an input to the electron gun assembly 6, with the horizontal and vertical synchronizing pulses removed therefrom. Each television field comprises 262.5 horizontal scanning lines which alternately produces odd and even television fields. Two television fields, an odd and an even field, are required to record a television picture.

Since television fields are produced at the rate of 60 fields per second resulting in 30 frames per second, conversion of the 60 interlaced television fields to 24 film frames per second requires discarding at least 12 television fields out of every 60. In the preferred embodiment of this invention, two interlaced television fields are recorded on each film frame and such a system is known as a full frame system. However, it is anticipated that the electron beam recorder of the present invention could be used equally well to record one television field on each film frame in a single-field system. Thus the frames per second associated with the generating means 6 would be a function of the number of fields to be recorded on a film frame on film 4.

In the present invention, two methods may be used for recording a predetermined number of the 60 television fields per second on each film frame. The first method is to discard one half of a television field between each film frame and the second method is to discard, in toto, an entire television field every two frames. In the preferred embodiment of the electron beam recorder, the first method is used and the intermittent mechanism 24 pull-down and settling time is in the order of 8 milliseconds or $1/120$ of a second.

Waveform B of FIGURE 2 illustrates the exposure and pull-down times of the intermittent means 24 compared to the video signals of the electron gun assembly 6. During the pull-down time of approximately $1/120$ of a second as illustrated in waveform B, one half of a television field is discarded as illustrated in waveform A. The one half television field is blanked by the blanking means 8 in response to a blanking signal produced from the control 30. Thus, during the film pull-down, the control 30 produces a blanking signal to blank the electron beam thereby discarding one half of a television field between each film frame such that a predetermined number of picture frames per unit time, 24 television pictures per second, equals the number of film frames per unit time, the 24 film frames per second.

In this embodiment, it is desirable to minimize effects of the join-up or picture splice between different television fields on a film frame. In this embodiment, the splice is phased to occur at the center of every other frame thereby making the splice remain substantially stationary while occurring only once in a given film frame. This phasing is accomplished by phase locking the intermittent mechanism 24 to the vertical synchronizing signals by the frame conversion and servo control 30 of FIGURE 1.

In FIGURE 1, the timing disk 38, directly connected to the intermittent mechanism 24, applies the second timing pulses of 60 c.p.s. to the control 30. Control 30 synchronizes the 60 c.p.s. timing pulse with the vertical synchronizing signals from the video signal receiver 28. Synchronism between the intermittent mechanism and the vertical synchronizing signals is maintained by adjusting the r.p.m. of motor 32.

Figure 3:
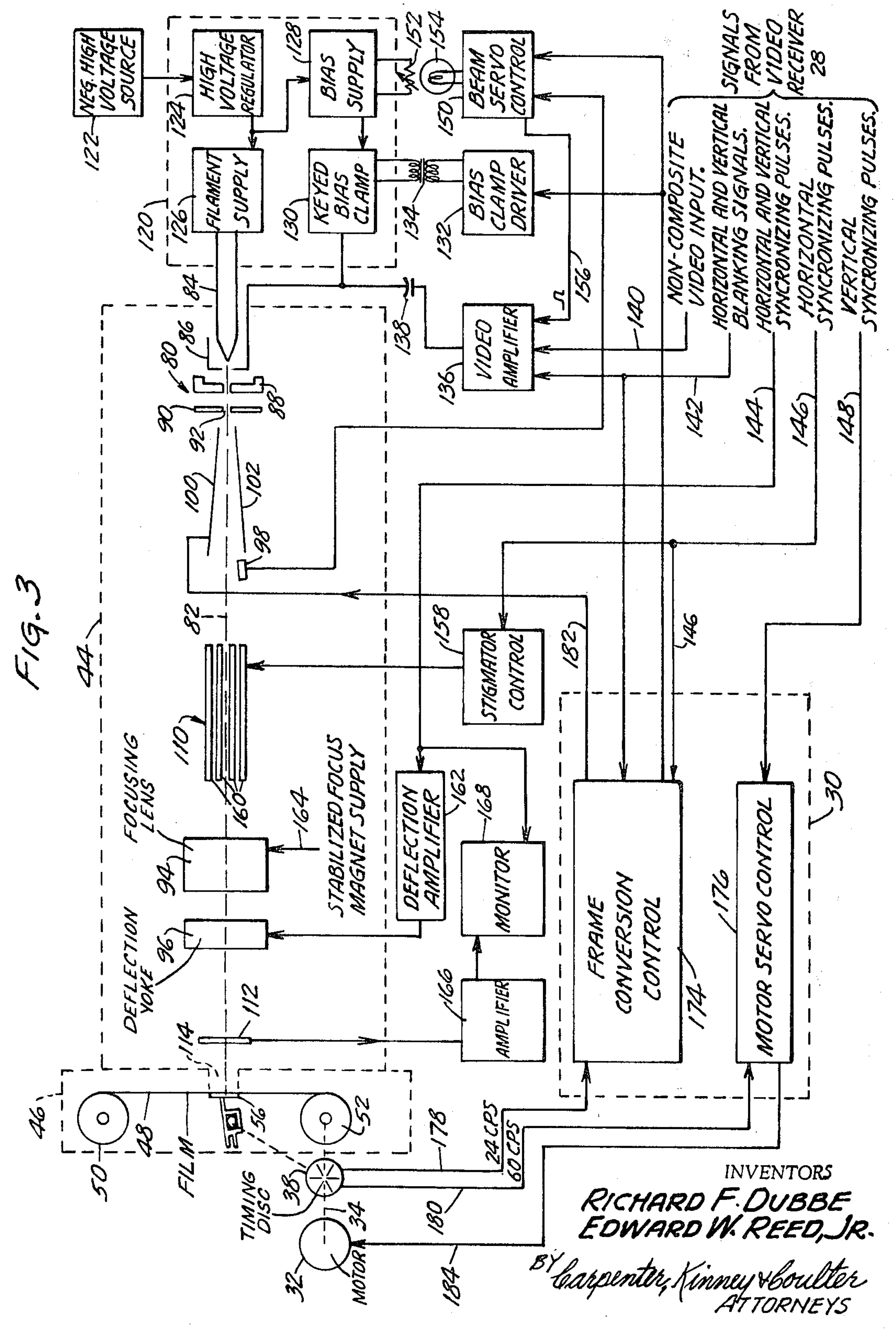
FIGURE 3 is a schematic diagram of the electrical control system for the preferred embodiment of FIGURE 1.

A portion of FIGURE 3 illustrates the electron optical system of the present invention and more particularly the components within the electron gun assembly chamber 44. A simple triode type electron gun denoted generally as 80 produces and directs an electron beam 82 along a predetermined path to bombard and expose the film 48 within the film chamber 46. A triode type electron gun designed in accordance with the parameters set forth in a book entitled Electron Optics" by O. Klemperer published in 1953 is illustrative of an electron gun which may be used in this invention.

The triode gun 80 employs a sharp hairpin filament cathode 84 to produce an electron beam. A tungsten filament cathode is used because it does not contaminate or oxidize in the atmosphere as do the known oxide cathodes. A grid 86 is interposed between an anode 88 and the filament cathode 84. The filament cathode 84 and the grid 86 may be operated at about 18,000 volts negative potential and the anode 88, the film chamber 46 and the film 48 are maintained at ground potential. Thus, the electrons from filament cathode 84, which is at a high negative potential, are accelerated by anode 88 to bombard and expose the film 48 which is at ground potential. An aperture disk 90 having an aperture 92 therein, with a diameter in the order of .010 inch, is located after the anode 88. The anode 88 limits the cross-sectional spot size of the electron beam to reduce spherical aberration and directs said beam along a predetermined path to bombard and expose the film.

The electron beam 82 can be modulated by applying a varying signal to the grid 86. The signal is usually a non-composite video signal which modulates the current of electron beam in accordance with the video information contained therein. The electron beam 82 is focused to a small size beam spot by an electromagnetic focusing lens 94 and said beam is deflected in a scan pattern by a deflection yoke 96.

In addition to the conventional elements associated with the triode electron gun 80, several other components have been added to the electron gun assembly. The first component is a Faraday cage 98 which is positioned adjacent the path followed by the modulated electron beam 82. Interposed between the Faraday cage 98 and the aperture disk 90 of the electron beam generating means 2 is a cage deflection means comprising a pair of deflection plates 100 and 102. In the preferred embodiment, deflection plate 102 is connected to ground potential and plate 100, when conditioned by a negative potential of about 250 volts, will deflect the modulated electron beam 82 into the Faraday cage 98 completely removing said beam from the film 48. By removing the electron beam 82 from the film 48, said beam is considered blanked relative to said film.

The Faraday cage 98 and the deflection plates 100 and 102 are used to provide blanking of the electron beam 82 during two blanking intervals: the normal blanking interval in response to the horizontal and vertical blanking signals of the composite video signal and a conversion blanking interval when one half of the television field between each film frame is discarded.

A stigmator assembly 110 is used to mask each horizontal scan line such that each scan line appears to be composed of a plurality of regularly spaced dots rather than of a continuous trace.

A secondary emission pickup ring 112, for collecting secondary emission in the vicinity of the film 48, is positioned along the path followed by the electron beam 82 and between the deflection yoke 96 and a film aperture 114. The film aperture 114 is the opening between the electron gun assembly chamber 44 and the film chamber 46 through which the electron beam 82 bombards and exposes the film 48. Additionally, the film aperture 114 cooperates with the film 48 and pressure plate 56 to form the vacuum seal.

Considering now the electrical control portion of FIGURE 3, the filament cathode 84 and grid 86 are connected to a high voltage section shown generally as 120. A conventional high voltage source 122, for example a negative 18,000 volts D.C., supplies the negative D.C. potential to control circuits within the high voltage section 120. The negative D.C. high voltage from source 122 is applied through a high voltage regulator 124 to a filament supply 126 and a bias supply 128. The bias supply 128 applies a bias voltage to a keyed bias clamp 130 which controls the D.C. operating level of grid 86 thereby controlling the electron beam current. The keyed bias clamp 130 is keyed by each horizontal synchronizing pulse. The anode 88 is maintained at ground potential. The electrons emitted by filament cathode 84 are accelerated by anode 88 due to the potential difference therebetween while the electron beam current is modulated by grid 86 under control of keyed bias clamp 130. A bias clamp driver 132 is coupled to the keyed bias clamp 130 via transformer 134 to control the clamping operation thereof. A second input to the keyed bias clamp 130 is from a video amplifier 136 which supplies video signals through a coupling capacitor 138 to vary the instantaneous potential of grid 86 to modulate the electron beam 82. Operation of the electron gun assembly is controlled by signals from the video signal receiver 28 of FIGURE 1. The signals from the video signal receiver 28 applied to the components of the electron beam recorder are: a non-composite video input signal on line 140; horizontal and vertical blanking signals on line 142; horizontal and vertical synchronizing pulses on line 144; horizontal synchronizing pulses on line 146; and vertical synchronizing pulses on line 148.

As described hereinbefore, the beam blanking is accomplished by means of the Faraday cage 98 and the deflection plates 100 and 102. When the electron beam 82 is deflected into the Faraday cage 98 during a horizontal blanking signal, said electron beam is momentarily turned on, by a reference pulse. The Faraday cage 98 collects all the electrons from the electron beam and generates an output signal which is applied to a beam servo control 150. The beam servo control 150 is operatively coupled to the bias supply 128, located within the high voltage section 120, by means of a lamp 154 and a photosensitive resistor 152. Additionally, the beam servo control 150 is directly coupled to and applies a reference pulse via conductor 156 to the video amplifier 136 during each horizontal blanking interval. Such a beam servo control is described in a copending application Ser. No. 506,188 of Edward W. Reed, Jr. filed Nov. 3, 1965 and entitled Electron Beam Recording System and Apparatus.

The stigmator 110 is controlled by a stigmator control 158 which receives horizontal synchronizing pulses via line 146. The stigmator 110 may comprise a plurality of spaced parallel conductive rods or stigmator bars 160 arranged to describe a cylinder having a circular cross-section with the electron beam 82 passing along the axis. The stigmator control 158 comprises a variable D.C. supply and a high frequency oscillator which is phase locked to the horizontal synchronizing pulses applied thereto through line 146. The high frequency signal is used to provide focus modulation which gives the appearance of breaking the horizontal scan line structure of the raster into a dot-like pattern. The oscillator frequency is about 8 megacycles and when phase locked to the horizontal synchronizing pulses insures a consistent dot-like pattern between each scan line. Such a scan line masking system is described in a co-pending application Ser. No. 506,192 of Edward W. Reed, Jr. filed Nov. 3, 1965 and entitled Scan Line Masking System.

The electromagnetic focusing lens 94 is connected to a stabilized current supply (not shown) via conductor 164. The deflection yoke 96 is controlled by deflection amplifiers denoted generally as 162, which amplifiers are connected to line 144 to receive horizontal and vertical synchronizing pulses. The deflection amplifiers 162, under control of the horizontal and vertical synchronizing pulses, control the deflection of the electron beam to produce a raster on the photographic film 48 at the rate of 30 interlaced television frames per second.

The secondary emission pickup ring 112 is used to precisely focus the electron beam. Secondary electrons emitted from material in the vicinity of the film plane are collected to produce an emission signal representative of the emission characteristic of the material. The emission signal is applied via an amplifier 166 to a standard television monitor 168. If the photographic film contains a conductive material, the secondary emission of the material will vary as a function of surface detail and the variations provide an electron picture of material detail which can be observed on the monitor 168. Subsequently the electromagnetic focusing lens 94 can be adjusted for maximum detail by adjusting the operating level of the stabilized current supply applied thereto via conductor 164.

The frame conversion and motor servo control 30 comprises a frame conversion control 174 and a motor servo control 176. The timing disk 38 is driven at the same r.p.m. as motor 32 through shaft 34. The timing disk 38 produces two output timing pulses each of which are of a different frequency. The first timing pulses have a timing frequency of 24 cycles per second (c.p.s.) which corresponds to the 24 frames per second associated with the intermittent means 20. The second time pulses have a frequency of 60 cycles per second (c.p.s.) which correspond to the vertical synchronizing pulses associated with each field of the television signal occurring at the rate of 60 fields per second. The timing disk 38 applies the 24 c.p.s. timing pulses via a conductor 178 to the frame conversion control 174 and the 60 c.p.s. timing pulses via a conductor 180 to the motor servo control 176.

The frame conversion control 174 is connected to line 142 to receive the horizontal and vertical blanking signals and to line 146 to receive horizontal synchronizing pulses each of which are in addition to the 24 c.p.s. timing signals from timing disk 38. Frame conversion control 174 is connected to deflection plate 100 via a conductor 182. The frame conversion control 174 applies a negative pulse, in the order of —250 volts, to the deflection plate 100 whenever the electron beam is to be blanked. Deflection plate 102 is at ground potential.

The motor servo control 176 is connected to line 148 to receive the vertical synchronizing pulses in addition to the 60 c.p.s. timing pulses from the timing disk 38. The motor servo control 176 controls operation of motor 32 via conductor 184 to phase lock the 60 c.p.s. timing pulses with the vertical synchronizing pulses. It is to be understood that other means are available for phase locking the film advance mechanism with the vertical synchronizing pulse.

In operation, the negative D.C. high voltage source 120 in cooperation with the high voltage regulator 124 and filament supply 126 maintains the filament cathode 84 at a constant negative D.C. potential. A non-composite video input signal is applied to the clamped video amplifier 136 through line 140. The video amplifier 136 applies the input video signal to the keyed bias clamp 130 through coupling capacitor 138. The keyed bias clamp 130 applies the video signal grid 86 to modulate the electron beam being produced by the potential difference between the filament cathode 84 and the anode 88. The electron beam passes through aperture 92 of the aperture disk 90, is focus modulated by stigmator 110, is focused by electromagnetic focusing lens 94 and is deflected into the scan pattern by deflection yoke 96. The deflected modulated electron beam bombards and exposes a frame on the portion of film 48 located within the electron gun assembly chamber 44.

When a blanking interval occurs in the composite video signal, a blanking signal is applied via line 142 to video amplifier 136 and the frame conversion control 174. The video amplifier 136 applies the blanking signal via capacitor 138 to keyed bias clamp 130 which changes the operating level of grid 86 to the blanking, pedestal or black level to produce zero beam current. Concurrently, the frame conversion control 174 responds to the blanking signal to apply a negative 250 volt blanking signal to deflection plate 100 via conductor 182. The blanking signal being applied to plate 100 is sufficient to deflect the modulated electron beam, when on, into the Faraday cage 98. A horizontal synchronizing pulse is concurrently applied via line 146 to the bias clamp driver 132, the beam servo control 150, the stigmator control 158 and the frame conversion control 174. The bias clamp driver 132 responds to the horizontal synchronizing pulse to apply clamping signals via transformer 134 to bias clamp 130. Keyed bias clamp 130 clamps the grid 86 to the bias supply during each horizontal synchronizing pulse. The beam servo control 150 responds to the horizontal synchronizing pulse to produce and apply a reference pulse during the back porch via conductor 156 to the video amplifier 136. The video amplifier 136 amplifies and applies the reference pulse via capacitor 138 to the control grid 86. The reference pulse is produced during the back porch which is the time interval between the trailing edge of the horizontal synchronizing pulse and the trailing edge of the horizontal blanking signal. The operating level of the grid 86 is momentarily raised by the reference pulse to turn on the electron beam 82 and permit the Faraday cage 98 to sample the electron beam current. The Faraday cage 98 applies an output signal, which is proportional to the sampled level of electron beam current, to the beam servo control 150. The beam servo control 150 compares the output signal with a reference signal, representative of a desired level of electron beam current, and produces a difference signal if a difference exists between the output signal and the reference signal. The difference signal is applied to the lamp 154 to vary the intensity thereof. The change in intensity of lamp 154 varies the resistance of photosensitive resistor 152 such that the change in the resistance varies the D.C. operating level of the bias supply 128 in a manner to make the electron beam current equal to the desired electron beam current level.

The frame conversion control 174 includes means for counting the number of horizontal synchronizing pulses. When 525 horizontal synchronizing pulses have been counted, this represents that a frame of two interlaced television fields have been recorded on a film frame. The frame conversion control 174 produces a blanking signal which is applied to deflection plate 100 via line 182 so as to discard one half of a television field. The operation of the frame conversion control 174, in response to the motor servo control 176, is such that the 525th horizontal synchronizing pulse counted occurs about half way through every other film frame. The electron beam remains deflected in the Faraday cage 98 during the discarded half of the field.

Figure 4:
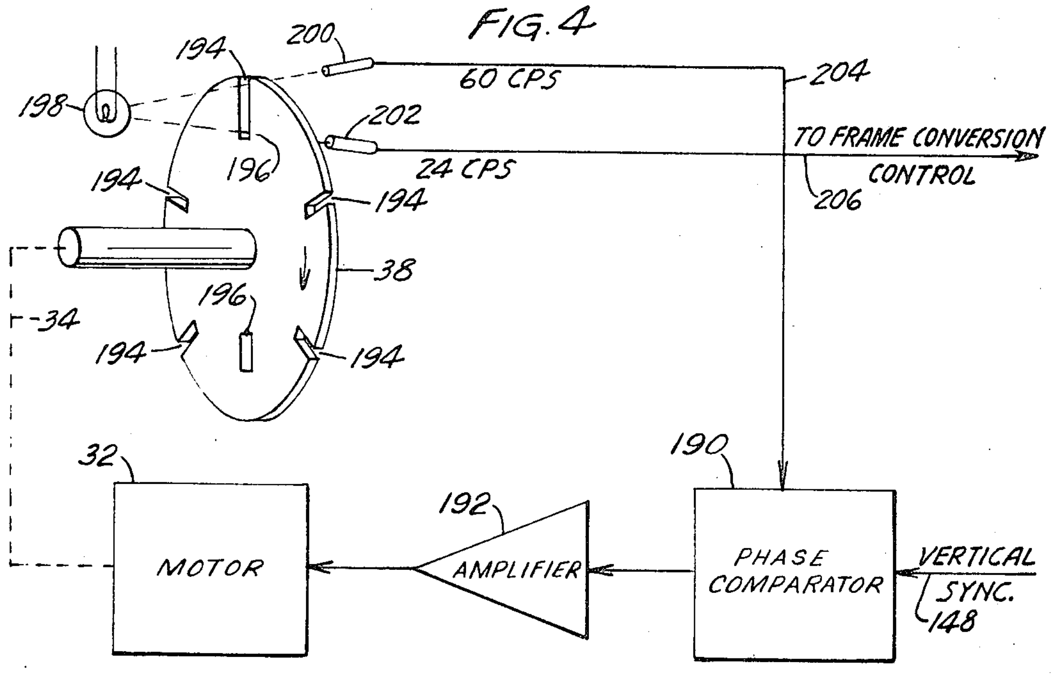
FIGURE 4 is a diagrammatic representation partially in block form illustrating a timing disk and a motor servo control of the electrical control system of FIGURE 3.

FIGURE 4 illustrates in detail the motor servo control 176 comprising a phase comparator 190 and an amplifier 192. The timing disk 38 contains two separate groups of slots. The first group comprises five equally spaced outer slots 194 about the outer periphery of disk 38 and two inner slots 196 intermediate the center and periphery of the disk 38. One of the outer slots 194 is elongated to provide one of the two inner slots. A lamp 198 is disposed on one side of the disk 38 and an outer photocell 200 and an inner photocell 202 are disposed on the other side of the timing disk 38. Photocells 200 and 202 are generally aligned relative to the outer slots 194 and inner slots 196 respectively to have light emanating from lamp 198 impinging thereon when a slot is in alignment therebetween. In the preferred embodiment, the timing disk 38 is connected to motor 32 via shaft 34 and is rotated at 720 r.p.m. by said motor 32 such that photocell 200 produces and applies timing pulses of 60 c.p.s. via conductor 204 to the phase comparator 190. Concurrently, photocell 202 produces and applies timing pulses of 24 c.p.s. via conductor 206 to the frame conversion control 174 illustrated in FIGURE 4. The phase comparator 190 simultaneously receives and compares vertical synchronization signals from the video receiver via line 148 with the 60 c.p.s. signals from disk 38. If a phase difference exists between these signals, the phase comparator produces an error signal which is applied to the amplifier 192 which operates to correct the speed of the motor 32 to synchronize the 60 c.p.s. timing signals with the vertical synchronizing signals.

Figure 5:
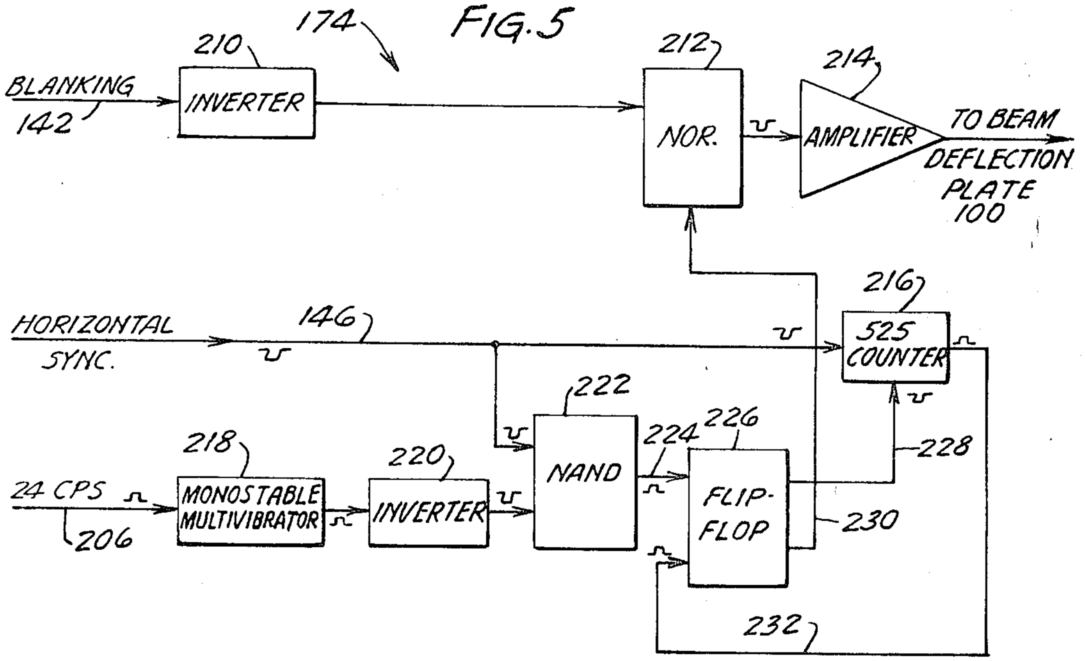
FIGURE 5 is a diagrammatic representation of a frame conversion control of the electrical control system of FIGURE 3.

The logical operation of the frame conversion control 174 is illustrated in FIGURE 5. Horizontal and vertical blanking signals are received from the video signal receiver 28 of FIGURE 1 via line 142 and applied to an inverter 210. Inverter 210 inverts and applies the blanking signal via a NOR gate 212 to a blanking amplifier 214. Blanking amplifier 214 produces and applies a blanking signal, in the form of a —250 volt pulse, to the deflection plate 100.

Horizontal synchronizing pulses are received from the video signal receiver 28 and applied as input to a 525-count counter 216. The counter 216 may be any 525-count counter, such as a transistorized ring counter, known in the art and must be capable of producing an output signal and resetting in a time interval not exceeding the time interval of a horizontal blanking pulse. The 24 c.p.s. timing pulse from the disk 38 is applied via conductor 206 to a monostable multivibrator 218 which produces an output pulse, which pulse has a period which is slightly longer than the period of a horizontal synchronizing pulse, in response to each timing pulse. The output of the multivibrator 218 is applied to an inverter 220 which inverts and applies the pulse as one input to a NAND gate 222. The second input to the NAND gate 222 is a horizontal synchronizing pulse from line 146. NAND gate 222 is connected to the reset input 224 of a flip-flop 226. Flip-flop 226 has a first output 228 to counter 216 and a second output 230 to NOR gate 212. Counter 216 is connected to a set input 232 of flip-flop 226.

In operation, a conversion sequence is initiated each time the counter 216 has completed a 525 count and applies an output signal on set input 232 to set flip-flop 226. When flip-flop 226 sets, first output 228 inhibits counter 216 from counting horizontal synchronizing pulses and second output 230 conditions NOR gate 212 to apply a blanking signal to blanking amplifier 214. Blanking amplifier 214 applies the blanking signal to deflection plate 102 to deflect the electron beam into the Faraday cage. The electron beam remains deflected in the Faraday cage during the film pull-down time to discard one half of a television field. When the pull-down time is complete and the photographic film has been decelerated to rest, the timing disk 38 produces a single pulse of the 24 c.p.s. timing pulse as an input to the multivibrator 218. Multivibrator 218 produces and applies a pulse, having a period slightly longer than that of a horizontal timing period, through inverter 220 as the second input to NAND gate 222. The NAND gate 222 will reset flip-flop 226 when a horizontal synchronizing pulse is applied to the first input via line 140. When flip-flop 226 is reset by NAND gate 222, the first output 228 enables counter 196 to start counting the horizontal synchronizing pulse and the second output 230 via NOR gate 212 removes the blanking signal from blanking amplifier 214 thereby allowing the electron beam to bombard the film. Counter 216 counts the horizontal synchronizing pulses until 525 pulses have been received and an output signal produced indicating that the electron beam has recorded a full frame of two interlaced television fields on the film. Thereafter, the conversion cycle is repeated. Thus, the frame conversion control 174 is operative to blank the electron beam by deflecting said beam into the Faraday cage during each pull-down time and each horizontal and vertical blanking pulse.

Having thus described a preferred embodiment of the present invention, it is to be understood that various modi-fications will be apparent to one having ordinary skill in the art, and all such changes are contemplated as may come within the scope of the appended claims.

What is claimed is:

1. Apparatus for electron beam recording of video information directly on an electron sensitive media comprising in combination, (a) an evacuatable chamber;

(b) means for generating within said evacuatable chamber an electron beam modulated by said video information and directing said modulated beam along a predetermined path to bombard and expose said electron sensitive media positioned within said evacuatable chamber;

(c) means for deflecting said modulated beam in a scan pattern directly on said media in response to generated synchronizing signals at a number of scan frames per unit time;

(d) means for intermittently advancing said media to position a media frame within said evacuatable chamber relative to said beam at a number of media frames per unit time which is less than the number of scan frames per unit time; and (e) means responsive to said generated synchronizing signals and said media advancing means for blanking said beam during advancement of said media within said evacuatable housing to synchronize a predetermined number of said scan frames per unit time with said lesser number of media frames per unit time, said blanking means including means for starting said beam to record a scan frame directly on said media within said evacuatable chamber when said media advancing means has positioned a media frame relative to said beam and removing said beam from said media when a scan frame has been recorded on said media frame.

2. The apparatus of claim 1 wherein the blanking means includes (1) means for phase locking said media advancing means with vertical synchronizing signals of said generated synchronizing signals, said phase locking means including means for starting said beam to record on said media when said media advancing means has positioned a media frame relative to said beans; and (2) means responsive tosaid starting means for removing said beam from said media when a scan frame has been recorded on said media frame.

3. The apparatus of claim 1 wherein the blanking means includes (1) means for starting said beam to record a scan frame on said media when said media advancing means has positioned a media frame relative to said beam; and (2) counting means responsive to said starting means for counting a predetermined number of horizontal synchronizing signals of said generated synchronizing signals which are equal to a scan frame, said counting means including means for producing a blanking signal for removing said beam from said media when a scan frame has been recorded on said media frame.

4. The apparatus of claim 1 wherein the blanking means includes (1) means for phase locking said media advancing means with said vertical synchronizing signals of said generated synchronizing signals, said phase locking means including means for starting said beam to record on said media when said media advancing means has positioned a media frame relative to said beam; and (2) counting means responsive to said starting means for counting a predetermined number of horizontal synchronizing signals of said generated synchronizing signals which are equal to a scan frame, said counting means including means for producing a blanking signal for removing said beam from said media when a scan frame has been recorded on said media frame.

5. The apparatus of claim 1 wherein the blanking means includes (1) means operatively connected to said media advancing means for phase locking said media advancing means with said vertical synchronizing signals; said phase locking means being operable to produce output pulses at a frequency equal to said number of media frames per unit time;

(2) a bi-stable device, having a first and second state, operatively coupled to receive said output pulses, said bi-stable device being set in said first state in response to simultaneously receiving an output pulse and a horizontal synchronizing signal for starting said beam to record on said media, said bi-stable device being capable of removing said beam from said media when reset into said second state;

(3) counting means operatively coupled to said bi-stable means and responsive to said horizontal synchronizing signals for counting a predetermined number of said horizontal synchronizing signals which are equal to a scan frame, said counting means upon counting said predetermined number of horizontal synchronizing signals being operative to reset said bi-stable device for removing said beam from said media.

6. The apparatus of claim 5 further including (f) a blanking amplifier operatively coupled to said bi-stable device for recording a scan frame on said media with said beam in response to said bi-stable device being set and blanking said beam from said media at the end of a recorded media frame in response to said bi-stable device being set, said blanking being of sufficient time to permit said media advancing means to position a new media frame relative to said beam for recording a new scan frame.

7. The apparatus of claim 1 wherein said electron beam records composite video signals including horizontal and vertical synchronizing signals and blanking signals and wherein the electron sensitive media is a photographic film.

8. Apparatus for causing an electron beam to record video information directly on a photographic film, said video information being derived from composite video signals including horizontal and vertical synchronizing signals and blanking signals, said apparatus comprising, (a) means for generating an electron beam modulated by video information from said composite video signal;

(b) means for deflecting said beam in a scan pattern on said film in response to said synchronizing signals at a number of scan frames per unit time;

(c) means for intermittently advancing said film relative to said beam at a number of film frames per unit time;

(d) means positioned between said scan pattern deflecting means and said beam generating means for deflecting said beam from said film in response to being energized;

(e) means spaced from said means for deflecting said beam from said film for collecting said beam when deflected from said film;

(f) means operatively coupled to said film advancing means and responsive to said synchronizing signals and said blanking signals for energizing said means for deflecting said beam from said film during advancement of said film and during the blanking interval of said blanking signals, said blanking means including means for de-energizing said means for deflecting said beam from said film to record a scan frame on said film when said film advancing means has positioned a film frame relative to said beam and for energizing said means for deflecting said beam from said film when a scan frame has been recorded on said film frame;

said means for deflecting said beam from said film being operative to remove said beam from said film at the end of a record film frame for a sufficient time to permit said film advancing means to position a new film frame relative to said beam for recording a new scan frame.

9. An electron beam recorder for recording video information directly on an electron sensitive media, comprising, (a) generating means for producing an electron beam modulated by said video information and directing said modulated beam along a predetermined path to bombard said media, said generating means including means for deflecting said modulated beam in a scan pattern on said media in response to generated scanning signals at a number of scan frames per unit time;

(b) means for intermittently advancing and positioning said media, relative to said scanned modulated beam, for bombardment by said beam to record scan frames as media frames at a number of media frames per unit time which is less than the number of scan frames per unit time; and (c) frame conversion means operatively connected to said generating means and said film transport means for synchronizing a predetermined number of said scan frames per unit time with said lesser number of media frames per unit time, said conversion means including means for blanking said beam from said media in response to said beam completing the recording of a scan frame on a media frame and during the advancing interval while said media is intermittently advanced and a new media frame positioned relative to said beam to record a new scan frame such that said predetermined number of scan frames per unit time equals said number of media frames per unit time.

10. The apparatus of claim 9 wherein the electron beam records composite video signals including horizontal and vertical synchronizing signals and blanking signals and the electron sensitive media is a photographic film, said frame conversion means including (1) means operatively connected to said film transport means for phase locking said intermittent advancing means with said vertical synchronizing signals; said phase locking means being operable to produce output pulses at a frequency equal to said number of film frames per unit time;

(2) a bi-stable device, having a first and second state, operatively coupled to said phase locking means, said bi-stable device being set in said first state in response to simultaneously receiving an output pulse and a horizontal synchronizing signal for starting said beam to record on said film, said bi-stable device being capable of removing said beam from said film when reset into said second state;

(3) counting means operatively coupled to said bi-stable means and responsive to said horizontal synchronizing signals for counting a predetermined number of said horizontal synchronizing signals which are equal to a scan frame, said counting means upon counting said predetermined number of horizontal synchronizing signals being operative to reset said bi-stable device for removing said beam from said film; and (4) blanking means operatively coupled to said bi-stable device for recording a scan frame on said film with said beam in response to said bi-stable device being set and blanking said beam from said film at the end of a recorded film frame in response to said bi-stable device being set, said blanking being of sufficient time to permit said intermittent advancing means to position a new film frame relative to said beam for recording a new scan frame.

11. A system for synchronizing frame conversion during recording of scan frames containing video information produced in response to vertical and horizontal synchronizing signals with advancing of media frames of a recording media to record scan frames on said media frames, said system comprising, (a) means for intermittently advancing said media at a number of media frames per unit time;

(b) a pulse generator operatively coupled to said intermittent advancing means for producing a first series of timing pulses at a rate equal to the number of vertical synchronizing signals associated with said scan pattern and a second series of timing pulses at a rate equal to the number of media frames per unit time;

(c) a phase comparator operatively coupled to said pulse generator for receiving said first series of timing pulses, said phase comparator being responsive to said first series of timing pulses and to the vertical synchronizing signals to phase lock operation of said intermittent advancing means with said vertical synchronizing signals;

(d) a control device having a first and second state operatively coupled to said pulse generator to receive said second series of timing pulses, said control device being set in said first state in response to simultaneously receiving a pulse of said second series of timing pulses and a horizontal synchronizing signal for starting said recording on said media, said control device being capable of terminating said recording on said media when reset into said second state;

(e) a counter responsive to said control device being set for counting a predetermined number of horizontal synchronizing signals which are equal to a scan frame, said counter, when reaching said predetermined number of counts, producing an output signal which resets said control device at the end of said media frame;

said control device remaining reset until set by one of said second series of timing pulses and a horizontal synchronizing signal to start recording of a scan frame on a new media frame.

12. Apparatus for causing an electron beam to record video information directly on a photographic film, comprising, (a) means for generating an electron beam modulated by said video information;

(b) means for deflecting said beam in a scan pattern on said film in response to generated scanning signals at a number of patterns per unit time;

(c) means for focusing said beam into a small cross-sectional spot size;

(d) means for varying the cross-section of said beam to produce a scan pattern appearing as a plurality of regularly spaced dots;

(e) means for intermittently advancing said film relative to said beam at a number of film frames per unit time;

(f) means positioned between said focus modulating means and said beam generating means for deflecting said beam from said film in response to being energized;

(g) means spaced from said means for deflecting said beam from said film for collecting said beam when deflected from said film;

(h) means operatively connected to said beam generating means and said beam collecting means for comparing the current level of the beam while deflected into said beam collecting means with a desired current level and adjusting the operating level of said beam generating means to make the beam current level equal to the desired level; and (i) means responsive to said scan pattern deflecting means and said film advancing means for energizing said means for deflecting said beam from said film into said beam collecting means in response to said beam completing the recording of a pattern on a film frame and to remove said beam from said film while said film is being advanced to position a new film frame for recording a new pattern.

13. A method of recording scan frames containing video information with an electron beam directly on an electron sensitive media comprising the steps of (a) generating an electron beam which is modulated by said video information;

(b) deflecting said beam in a scan pattern on said media in response to generated scanning signals at a number of scan frames per unit time;

(c) intermittently advancing and positioning said media relative to said beam to record scan frames as media frames at a number of media frames per unit time which is less than the number of scan frames per unit time;

(d) blanking said beam during advancement of said media to synchronize a predetermined number of said scan frames per unit time with said lesser number of media frames per unit time;

(e) starting said beam to record a scan frame on said media when said advancing means has positioned a media frame relative to said beam; and (f) removing said beam from said media when said beam has recorded a scan frame on said media frame such that said predetermined number of scan frames per unit time equals said number of media frames per unit time.

14. The method of claim 13 wherein the video information is derived from a composite video signal having video information signals, synchronizing signals and blanking signals and wherein the electron sensitive media is a photographic film.

References Cited

UNITED STATES PATENTS 3,366,733 1/1968 Frohbach ............ 178—6.7

ROBERT L. GRIFFIN, *Primary Examiner.*

HOWARD W. BRITTON, *Assistant Examiner.*